Patented Oct. 23, 1951

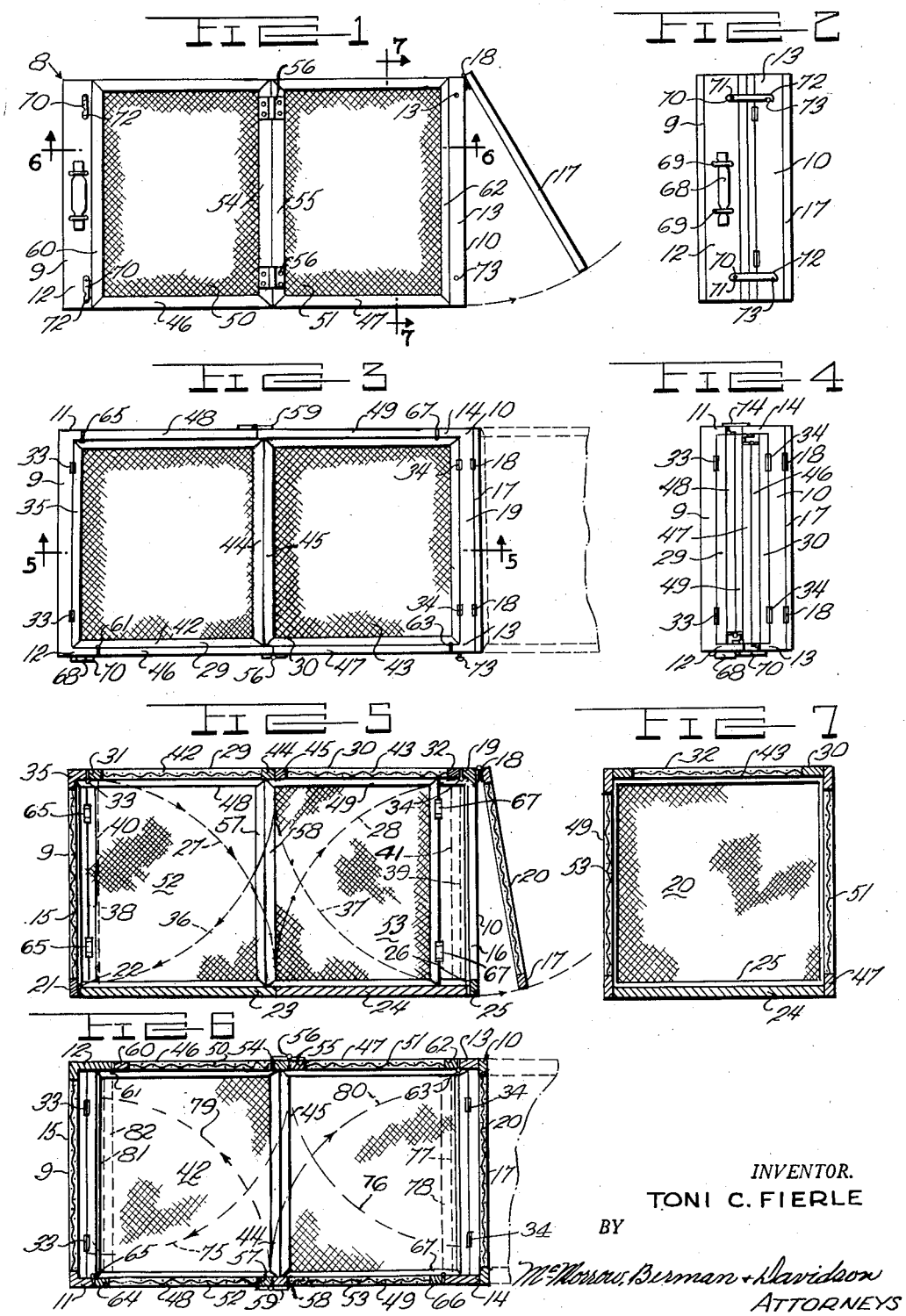

2,572,461

UNITED STATES PATENT OFFICE 2,572,461

PORTABLE ANTI-INSECT SHELTER

Toni C. Fierle, Detroit, Mich.

Application October 1, 1948, Serial No. 52,353

3 Claims. (Cl. 20—2)

This invention relates to screen shelters, and particularly to a portable outdoor folding anti-insect shelter.

The main object of my invention is to provide a screen shelter for outdoor use to serve as a protection against insects and which provides maximum roominess when set up while being foldable or collapsible in order to reduce the shelter to small compass for rendering it portable and convenient to stow into a limited space in a house or a garage and the like.

Another object is to provide an anti-insect shelter of the indicated character which is quickly and conveniently set up for use and as quickly folded together again when no longer required.

A further object is to have such an anti-insect shelter which not only screens out insects, and particularly mosquitoes, but provides ample ingress of sunlight and fresh air to the interior thereof.

It is also an object to produce an outdoor shelter of the mentioned type which when erected has a firm floor and is sufficiently sturdy to be proof against sagging and collapse of any of the parts thereof despite its portable character.

A practical object is to make such a folding shelter of light screened frames pivoted or hinged together to form a simple structure unit capable of being made in various sizes and sold at a reasonable figure in order to encourage general distribution.

Other objects and advantages of my invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a side elevation of a portable anti-insect shelter made according to the invention and embodying the same in a practical form, the shelter being shown in erected condition;

Figure 2 illustrates the same shelter in collapsed or folded condition for portability;

Figure 3 is a top or plan view of the shelter of Figure 1 in its erected form;

Figure 4 is a plan view of the collapsed or folded shelter of Figure 2, as seen from the top in said figure;

Figure 5 is a vertical section taken on line 5—5 in the plan view of Figure 3;

Figure 6 is a horizontal section taken on line 6—6 in Figure 1;

Figure 7 is a vertical section taken on line 7—7 in Figure 1.

Throughout the views, the same reference numerals indicate the same or like parts.

When outdoors it is highly desirable to obtain full benefit of the sunlight and fresh air, but in many localities insects interfere seriously with such benefits and frequently make it necessary to remain indoors in order to avoid the insects. Especially is it important for small children and infants unattended by parents to have protection against injurious effects of insects and small animals while enjoying the healthful atmosphere of sunshine and fresh air in the outdoors. It is also often important at beach resorts to have protection from insects, and this becomes very important on camping trips and at picnics upon occasion which are traditionally troubled with insects. When camping, the insects are usually an intolerable nuisance at night, and yet ventilation on hot sultry nights is necessary for refreshing slumber.

Upon considering this problem, it has occurred to me that a screened shelter should be available which is sufficiently roomy for the above-mentioned purposes to render good service near the home, at the beach, when camping outdoors, etc., and yet capable of being folded together into such compact form as to be readily stowed away in a small space so as to be unobstrusive when not in use. As a result, I have found it quite feasible to produce a portable and collapsible anti-insect shelter of this character, as will now be more particularly pointed out and described.

In the practice of my invention, and referring again to the drawing, a portable folding shelter, generally indicated at 8, includes a pair of U-shaped end walls or frames so arranged that the bights thereof are in face-to-face relation with respect to each other, each of which has an open intermediate area, the end frame 9 having at the rear edge thereof a vertical strip or leg 11 which is substantially as wide as two thicknesses of frame 9, while at the front vertical edge is a relatively wider strip or leg 12 which is in fact substantially twice as wide as strip 11. In reverse fashion, the frame 10 has upon its forward vertical edge a strip or leg 13 of double width similar to that of strip 11 and of equal length, while the rear vertical edge is provided with a quadruple wood strip or leg 14 of equal dimensions with previously-mentioned wide strip 12. The open area of end frame 9 is occupied by a screen 15, whereas the open area 16 of frame 10 at the opposite end is left open to serve as a doorway. However, an auxiliary frame 17 is hinged at the upper edges thereof by means of hinges 18 to the upper portion 19 of end frame 10 and the open area of auxiliary frame or door 17 is occupied by a screen 20, so that end frame 10 with door 17 and its screen 20 will be equivalent to the opposite end frame 9 with its screen 15.

Upon the inner side of the lower portion 21 of end frame 9 are a pair of hinges 22 to which a floor section 23 is attached for pivotal movement about a horizontal axis, while a corresponding floor section 24 is similarly hinged to the lower strip 25 of frame 10 by means of hinges 26. The floor sections 23 and 24, as best shown in Figure 5, may thus be swung upwardly against their respective end frames 9 and 10 through the arcs indicated in broken lines at 27, 28. It is thus evident that floor sections 23 and 24 are not directly connected together, but merely fold down into line when other portions of the frame hold the structure into a unit in the extended form. Similar remarks apply to the roof sections or frame members 29, 30 which have their outer end portions 31, 32 connected by hinges 33, 34 to the upper frame portions 35 and 19 of end frames 9 and 10, respectively for pivotal movement about horizontal axes, so that these roof frames 29 and 30 may be swung down into pendent position through the arcs indicated in broken lines at 36, 37. It is to be noted that the upper portions 35 and 19 of frames 9 and 10 are substantially of double width in such fashion that when the floor sections 23 and 24 are first folded up to occupy the positions indicated in broken lines at 38, 39, the roof frame members 29 and 30 will fold down to occupy overlapping positions indicated at 40, 41, but differing from the floor sections 23 and 24 in that the latter are solid or massive in construction while the open areas in frames 29 and 30 are occupied by screens 42, 43. The roof frames 29 and 30 may have their inner adjacent ends 44 and 45 hooked or latched together by means, not shown, when the shelter is set up, which is also true of the floor sections 23 and 24.

Side walls are provided for the shelter in the form of a pair of upright screen frames or sections 46, 47 which comprise one upright wall upon the near side and 48, 49 upon the far side which comprise another upright wall, the open areas of these frames being occupied by screens 50, 51, 52 and 53, respectively. Sections 36, 47, 48 and 49 are all of equal length. The screen frames 46 and 47 are hinged together upon their mutually adjacent portions 54, 55 by means of hinges 56, 56 for pivotal movement about a vertical axis, while the respectively opposite portions 57, 58 of screen frames 48 and 49 are similarly hinged together by hinges 59 for pivotal movement about a vertical axis. As the hinges are located upon the outside of the screen frames just described, it is evident that they may be folded inward toward each other at the center. However, screen frame 46 is hinged at its left vertical portion 60 by means of hinges 61 to the wide vertical strip 12 of end frame 9, while in similar fashion the vertical portion 62 of screen frame 47 is hinged by means of hinges 63 to the previously-mentioned vertical double-width strip 13 of end frame 10. Likewise, a vertical end portion of frame 48 at 64 is connected to vertical strip 11 of end frame 9 by means of hinges 65 and at the opposite end vertical portion 66 of screen frame 49 is connected by means of hinges 67 to the vertical strip 14 of end frame 10.

The arrangement is such that when the shelter is first collapsed in the condition shown in Figures 2 and 4, the relatively wide strip 12 has a handle 68 secured thereto by a pair of handle fixtures 69, 69, while the strip is also provided with a pair of cleat hooks 70, 70 pivoted by screws or pins 71, 71 to said strip, and the hooked ends 72, 72 are adapted to engage with headed pins or screws 73, 73 on strip 13 of frame 10. As also shown in Figure 4, upon the opposite sides of strips 11 and 14 are similarly interconnected by cleat hooks 74. When the shelter is to be set up, the cleat hooks 70 and 74 are, of course released and the end frames 9 and 10 are pulled apart until the side frames 46, 47, 48 and 49 hinged to strips 11, 12, 13 and 14 are straightened out to form the side walls of the shelter, after which the roof frames 29 and 30 are swung upwardly until they are in line and fastened in position by any means which may be adopted for the purpose to hook or bolt their inner adjacent portions 44 and 45 together, and subsequently the floor sections 23 and 24 are swung down into line so that the floor sections and roof sections prevent inward folding or collapse of the side walls. The shelter when thus erected will have an open end in frame 10 by virtue of the open area 16 thereof which is not occupied by any screen, and then use will be had of pendent door 17, which instead of being hinged along one side as usual with doors, is instead hinged at the top, so that the door 17 is thus swung upwardly in order to open the doorway 16 in frame 10, and will also automatically close down behind the person entering the shelter.

When the shelter is to be folded together again, the first steps have already been described, namely, to raise the floor sections 23 and 24 through arcs 27 and 28 to occupy the positions indicated at 38 and 39 and thereafter the roof frames 29, 30 are swung down to occupy positions indicated at 40 and 41, whereafter the intermediate upright portions 54 and 55 of frames 46 and 47 are swung inward, and then the intermediate upright portions 57, 58 of frames 48 and 49 are similarly swung inward, portions 54 and 55 of frames 46 and 47 following the arcs indicated at 75, 76 and folding into the positions indicated in broken lines at 77, 78 within the floor section 24 and roof section 30 adjacent to frame 10, the other frames 48 and 49 describing with their inner portions 57 and 58 the arcs indicated at 79 and 80, so that they will be folded in the opposite direction toward frame 9 to occupy the positions indicated at 81, 82 within the floor section 23 and roof section 29, all as best shown in Figure 6. When the parts are thus all collapsed or folded together, the cleat hooks 70 and 74 may be hooked upon the strips 13 and 11, respectively, when the entire ensemble will be such a compact package that it may be carried by means of handle 68 if the shelter is of a small size such as that used by children, but even in larger sizes, when the shelter is folded together, it may be transported to the point at which it is to be set up again or else stowed away, being substantially light and open in structure throughout.

Manifestly, variations may be resorted to and parts and features may be modified or used without others within the scope of the appended claims.

Having now fully described my invention, I claim:

1. A portable folding shelter comprising a pair of U-shaped end walls arranged so that the legs thereof are in face-to-face relation with respect to each other, one of the legs of each of said U-shaped end walls being longer than the other leg thereof, the longer leg of one end wall being in alignment with the shorter leg of the other of said end walls, the longer leg of each of said end walls being of the same size and the shorter leg of each of said end walls being of the same size, an upright wall disposed between each of the aligned pair of shorter and longer legs of said end walls and having its ends connected to the adjacent shorter and longer legs of said end walls for swinging movement about a vertical axis inwardly of the end walls, each of said upright walls embodying two sections arranged in end-to-end facing relation with the facing ends connected together for pivotal movement about a vertical axis.

2. A portable folding shelter comprising a pair of U-shaped end walls arranged so that the legs thereof are in face-to-face relation with respect to each other, one of the legs of each of said U-shaped end walls being longer than the other leg thereof, the longer leg of one end wall being in alignment with the shorter leg of the other of said end walls, the longer leg of each of said end walls being of the same size and the shorter leg of each of said end walls being of the same size, an upright wall disposed between each of the aligned pairs of shorter and longer legs of said end walls and having its ends connected to the adjacent shorter and longer legs of said end walls for swinging movement about a vertical axis inwardly of the end walls, each of said upright walls embodying two sections arranged in end-to-end facing relation with the facing ends connected together for pivotal movement about a vertical axis, and a pair of roof sections superimposed upon said end walls in end-to-end confronting relation and having each of the non-confronting ends pivotally connected to the top of the adjacent end wall for pivotal movement about a horizontal axis.

3. A portable folding shelter comprising a pair of U-shaped end walls arranged so that the legs thereof are in face-to-face relation with respect to each other, one of the legs of each of said U-shaped end walls being longer than the other leg thereof, the longer leg of one end wall being in alignment with the shorter leg of the other of said end walls, the longer leg of each of said end walls being of the same size and the shorter leg of each of said end walls being of the same size, an upright wall disposed between each of the aligned pairs of shorter and longer legs of said end walls and having its ends connected to the adjacent shorter and longer legs of said end walls for swinging movement about a vertical axis inwardly of the end walls, each of said upright walls embodying two sections arranged in end-to-end facing relation with the facing ends connected together for pivotal movement about a vertical axis, a pair of roof sections superimposed upon said end walls in end-to-end confronting relation and having each of the non-confronting ends pivotally connected to the top of the adjacent end wall for pivotal movement about a horizontal axis, and a pair of floor sections disposed in end-to-end confronting relation and having each of the non-confronting ends pivotally connected to the bottom of the adjacent end wall for pivotal movement about a horizontal axis.

TONI C. FIERLE.

REFERENCES CITED

The following references are of record in the file of this patent:

UNITED STATES PATENTS

| Number | Name | Date |
| --- | --- | --- |
| 735,906 | Prasky | Aug. 11, 1903 |
| 916,848 | Cox | Mar. 30, 1909 |
| 1,016,523 | Rinner | Feb. 6, 1912 |
| 1,322,419 | Francis | Nov. 18, 1919 |
| 1,464,391 | Orban | Aug. 7, 1923 |
| 1,630,941 | Hood | May 31, 1927 |
| 1,822,585 | Douglas et al. | Sept. 8, 1931 |